Oct. 18, 1927. 1,645,889
O. ZERK, NOW BY JUDICIAL CHANGE OF NAME O. U. ZERK
LUBRICANT FEEDING NIPPLE AND THE LIKE
Filed Sept. 20, 1923
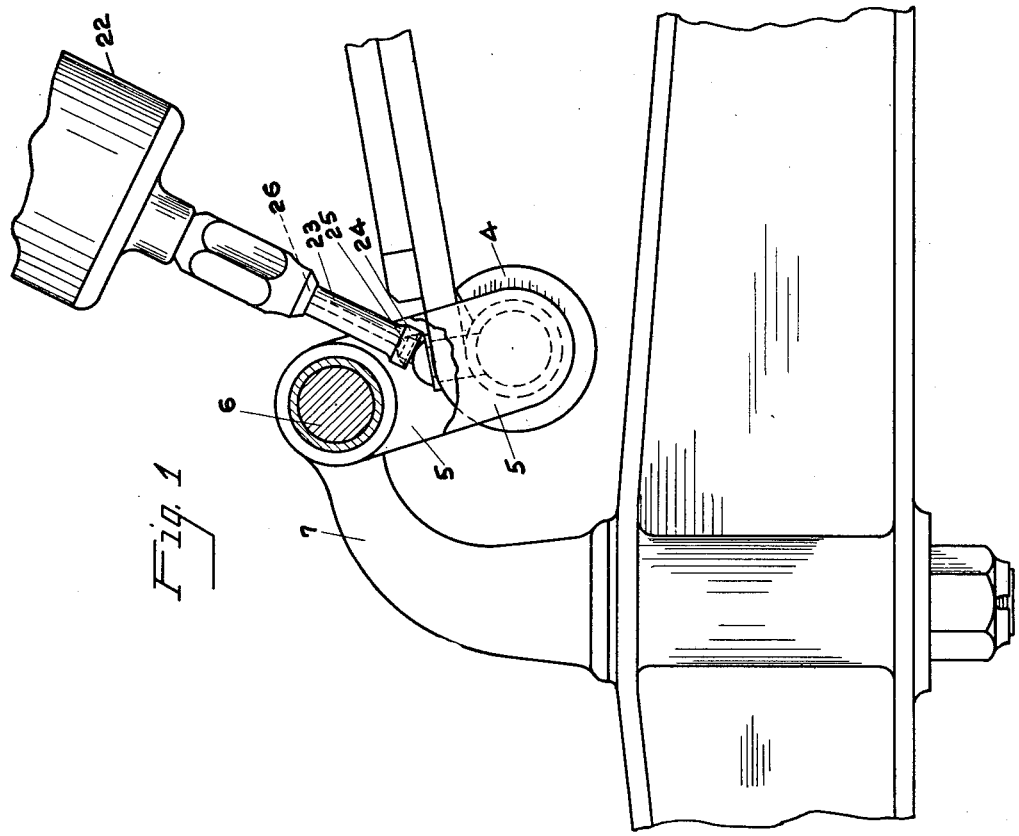
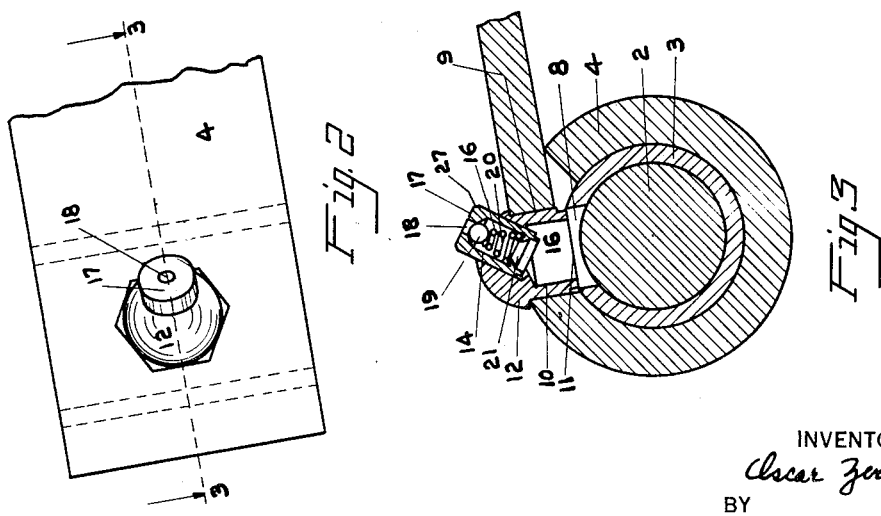
INVENTOR
Oscar Zerk
BY
Richey, Singh & Watts.
ATTORNEYS Patented Oct. 18, 1927.

1,645,889

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

LUBRICANT-FEEDING NIPPLE AND THE LIKE.

Application filed September 20, 1923. Serial No. 663,762.

This invention relates to a lubricant feeding nipple.

An object of my invention is to provide a nipple, the main body of which can be pressed into an aperture in an element to be lubricated, and which is constructed with an inlet arranged so that the pressure of the lubricant being injected therethrough will tend to maintain the nipple seated in position.

Another object of my invention is to provide a short nipple having an inlet arranged to direct a portion of the lubricant being injected therethrough against the opposite inner wall thereof which extends within an opening in an element to be lubricated thereby utilizing the pressure of the lubricant to maintain the nipple seated with the element to which it is attached.

Another object of my invention is to provide a lubricant feeding nipple, which is short of shank and has a short externally protruding inlet portion, adapted for use especially on Ford cars.

Still another object of my invention is to provide a nipple which is efficient, cheap to manufacture, readily positioned with an element to be lubricated, and with which a manually maintained leak proof contact can be made to inject lubricant therein by direct pressure of a lubricating apparatus thereagainst.

Other objects will appear and be pointed out in the following specification, in which a device constructed in accordance with my invention is disclosed.

In the drawings attached to and forming a part of this specification, Figure 1 is a side elevation showing the nipple attached to a Ford spring with a lubricant injecting apparatus in operative relation therewith; Fig. 2 is a top plan view of the nipple assembled with the spring end; Fig. 3 is an enlarged sectional view taken on line 3—3 of Fig. 2, showing my improved nipple attached to a spring end.

Referring to the drawings by characters of reference, 2 represents a spring bolt having a surrounding bushing 3 mounted thereon to receive the spring end 4 which is circled therearound. The spring bolt is carried at each end by a pair of shackles 5, which hang from a bolt 6 secured in a supporting bracket 7. The bushing and spring end are provided with aligned openings 8 and 9 respectively, through which oil is normally squirted against the spring bolt. The construction, so far described, is of a conventional type used in "Ford" automobiles, and my improved nipple is shown applied thereto.

I provide a nipple which can readily be placed into the opening above described without interfering with the movement of the spring end, and which has a minimum protruding portion provided with an elbow adapted to form an inlet through which lubricant is injected. The nipple consists of a hollow body, having preferably a short cylindrical shank 10, the outlet end of which is open at 11 and the opposite end of which is formed as a semi-spherical head 12 which overhangs the shank portion. The overhanging head provides a shoulder 13 which abuts the outer surface of the spring end, when the shank of the nipple is pressed into the opening 9 therein. The length of the shank is substantially the same as the thickness of the spring so that it will not interfere with the rotating movement thereof relative to the bolt.

The head is provided with an angularly extending opening therethrough, into which an inlet elbow 14 is driven or pressed. The elbow is provided with a passage 15 which is in communication with the hollow portion 16 of the nipple, and is arranged so that a portion of the lubricant injected through the passage therein will be directed against the opposite inner wall of the hollow portion of the shank, adjacent the outlet opening. The angular arrangement of the elbow relative to the shank is preferably such that the longitudinal axis of the passage in the elbow, if extended, would intersect the lower outlet edge of the shank at the opposite side therefrom. A part of the injected lubricant will thus be directed against the end of the shank, and the pressure of the same tends to force the shank into the spring opening, thereby maintaining the nipple in position therewith, while the other part of the lubricant will pass directly into the spring opening through the hollow housing. The elbow, instead of being inserted in the nipple body may be cast integrally therewith, if so desired.

The hollow elbow is formed preferably cylindrical, the end extending into the nipple body being open. The outer end of the elbow is formed to provide a transverse contact face 17, having an inlet opening 18 therein of smaller diameter than the passage 15. A ball valve 19 is normally maintained against the inside of the contact face to close the opening 18, by a coil spring 20. The spring is secured within the elbow by lugs 21 broached from the inner wall thereof.

For purposes of illustration, I have shown a lubricant dispensing apparatus 22, which is constructed similarly to that illustrated and described in my application filed Nov. 21, 1922, Serial No. 602,466. This apparatus is provided with a rigid discharge nozzle 23 having a connector 24 at its end, said connector being provided with a spherically recessed contact face 25 having an outlet opening 26 therein. This contact face fits over the peripheral edge 27 of the elbow and forms a tight joint when maunally pressed thereagainst. The contact faces of the elbow and connector are such that the leakproof connection can be made or maintained at various relative angular relations. Suitable means are employed for discharging lubricant from the nozzle into the nipple.

When the dispensing apparatus is positioned to feed lubricant into the nipple, pressure directed against the apparatus will project lubricant through the elbow against the opposite side of the inner wall at the outlet edge of the nipple shank, and also directly against the spring bolt in the manner herein described.

With this type of nipple and dispensing apparatus the user can readily form a contact and inject lubricant through the nipple, where the nipple would normally be inaccessible to a manually operated pressure injecting apparatus.

It is to be understood that my nipple, while designed especially for the use described, may be used in connection with various other bearings to feed lubricant to the same. It is also understood that various other types of dispensing apparatus can be used with my nipple, other than that shown. Various changes may be made in the details of the nipple construction shown, without departing from the spirit of my invention and the scope of the claims.

What I claim is:—

1. A nipple for feeding lubricant to a bearing comprising a hollow body having an outlet opening at one end, and an inlet elbow projecting from said body, said elbow having a passage therethrough in communication with the hollow portion of said body and arranged to have the extended axis thereof intersect the outlet end of the opposite wall of said hollow body.

2. In combination a bearing; an element movable relative to said bearing, said element having an opening therethrough in open communication with said bearing; and a nipple for delivering lubricant to said bearing, said nipple comprising a hollow body having an open outlet end driven into the opening in said movable element, and an elbow extending through the outer end of said body at an obtuse angle to the longitudinal axis thereof, said elbow having a passage therein to direct a portion of the lubricant injected therein against the inner end of said body thereby assisting in maintaining said nipple in position with said movable element.

3. In combination a shackle bolt; a spring end encircling said bolt and movable relative thereto; said spring end having a circular opening therethrough; and a nipple for delivering lubricant to said bolt, said nipple comprising a body having a head and a hollow cylindrical shank of substantially the same length as the thickness of said spring end and open at its end, said shank being driven into the opening in said spring end, and means extending at an angle through said head for directing lubricant against said bolt when injected therethrough by pressure.

4. A nipple for feeding lubricant from a nozzle to an element to be lubricated comprising a nipple body, one end of which is provided with an outlet opening, said body having an axial bore extending to the outlet opening from a point near the other end of the body, a separate tubular elbow projecting at an obtuse angle from said other end of the body, said elbow having a passage extending therethrough, the outer end of said elbow being formed for connection with a nozzle from which lubricant may be ejected into the passage, and a spring pressed valve in the passage of the elbow for closing the passage, said valve being opened by the pressure of lubricant thereagainst when injected under pressure.

5. A nipple for feeding lubricant from a nozzle to an element to be lubricated comprising a nipple body, one end of which is provided with an outlet opening, said body having an axial bore extending to the outlet opening from a point near the other end of the body, a separate tubular elbow projecting at an obtuse angle from said other end of the body, the longitudinal axis of said elbow intersecting the body portion of said nipple at a point adjacent the outlet thereof so that application of manual pressure along the elbow longitudinal axis will tend to keep the nipple seated, said elbow having a passage extending therethrough, the outer end of said elbow being formed for connection with a nozzle from which lubricant may be ejected into the passage, and a spring pressed valve in the passage of the elbow for closing the passage, said valve being opened by the pressure of lubricant thereagainst when injected under pressure.

In testimony whereof I hereunto affix my signature this 17th day of September, 1923.

OSCAR ZERK,
*Now by Judicial Change of Name Oscar Ulysses Zerk.*